Sept. 15, 1964 J. T. LOONEY 3,148,595
FLUID MOTOR ACTUATOR
Filed May 21, 1963 2 Sheets-Sheet 1

INVENTOR
JOHN T. LOONEY,
BY Chas. H. Trotter
ATTORNEY

Sept. 15, 1964  J. T. LOONEY  3,148,595
FLUID MOTOR ACTUATOR
Filed May 21, 1963  2 Sheets-Sheet 2
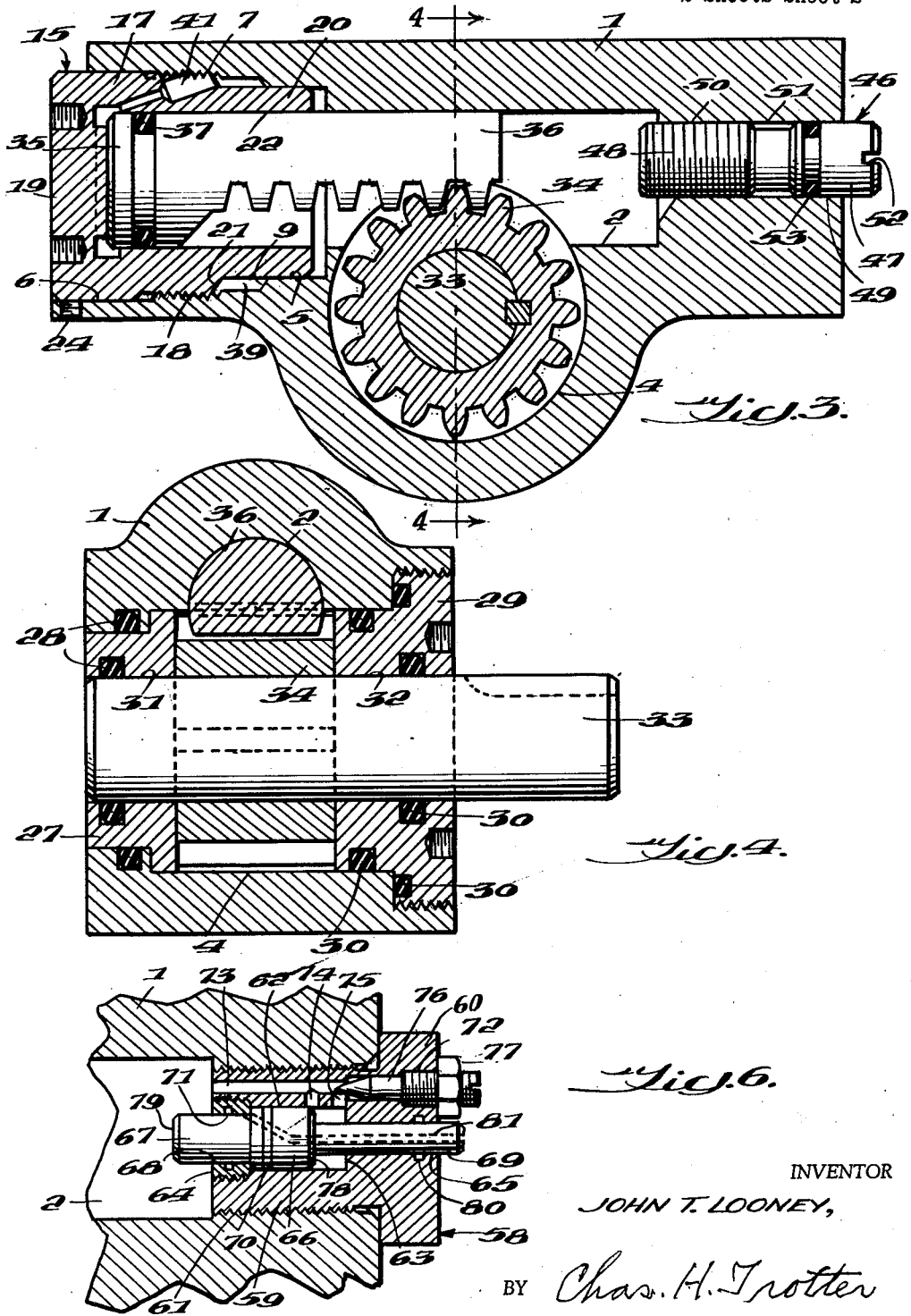
INVENTOR
JOHN T. LOONEY,
BY Chas. H. Trotter
ATTORNEY United States Patent Office 3,148,595
Patented Sept. 15, 1964

3,148,595
FLUID MOTOR ACTUATOR
John T. Looney, Wadsworth, Ohio, assignor to The Ohio Oscillator Company, Pittsburgh, Pa., a corporation of Ohio
Filed May 21, 1963, Ser. No. 281,977
13 Claims. (Cl. 92—11)

This invention relates generally to a fluid motor actuator by which linear motion is converted to rotary motion. More specifically the invention relates to the specific construction of a fluid motor actuator which is especially adapted for rotating a shaft back and forth between predetermined adjustable limits in each direction.

Fluid motor actuators of this general type, in which a rack which is operatively connected to a reciprocating piston is disposed in mesh with a gear secured to a rotatably mounted shaft, whereby the shaft is rotated in first one direction and then the other as the piston and rack secured thereto are reciprocated back and forth, are old and well known. Consequently no claim is made broadly to such a construction.

However fluid motor actuators of this type are adapted for use in many applications where it is essential that the rotation of the shaft be accurately controlled in both directions. Also it is desirable that the movement of the piston and rack be gradually cushioned to a stop as they approach the limit of their movement. It is likewise desirable that a fluid motor actuator of this type be so constructed that it can be quickly and easily assembled and disassembled for cleaning, repairing, adjusting and/or replacement of worn parts.

It is therefore the principal object of this invention to provide, in a fluid motor actuator of the aforesaid character, means by which the reciprocatory movement of the piston and rack, and consequently the rotary movement of the shaft, can be accurately adjusted.

Another object of the invention is to provide in a torque converter of the aforesaid character means by which the movement of the piston and rack are gradually cushioned to a stop as they approach the limit of their movement.

Still another object of the invention is to so construct a fluid motor actuator of the aforesaid character that it can be quickly and easily assembled and disassembled for cleaning, repairing, adjusting, and/or replacement of worn parts.

Having stated the principal objects of the invention other and more specific objects of the invention will be apparent from the following specification, and the accompanying drawings forming a part thereof in which:

FIG. 3 is a view similar to FIG. 1 illustrating a slightly modified form of the invention;

FIG. 4 is a central transverse vertical section taken on the line 4—4 on FIG. 3; FIG. 6 is an enlarged detail section through a combined stroke adjusting and cushioning mechanism.

Figure 1:
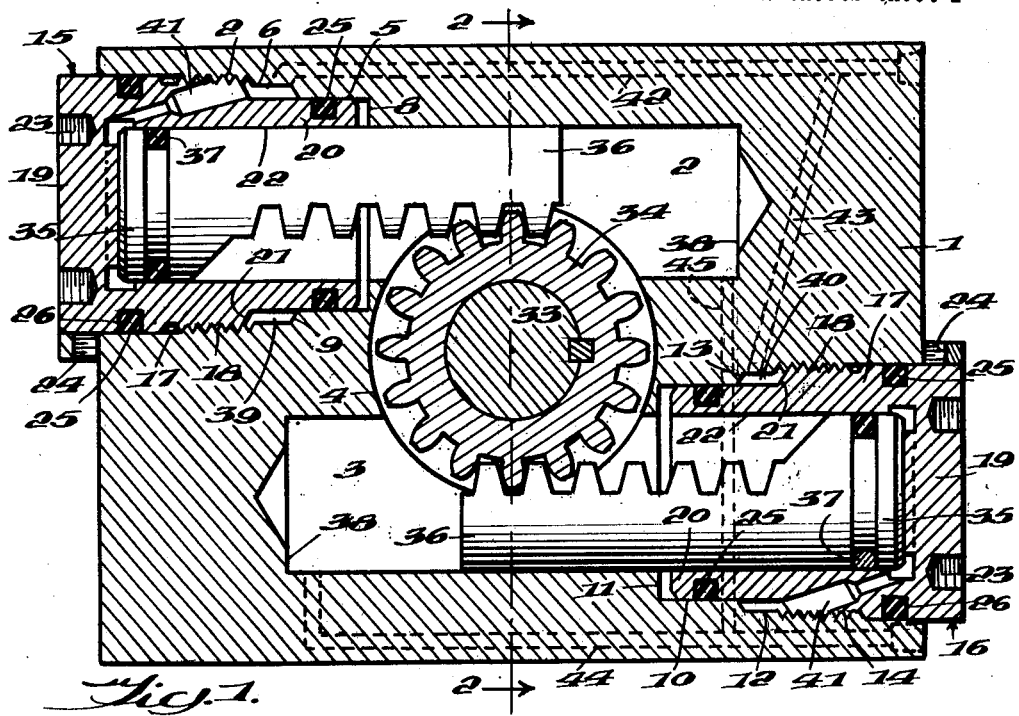
FIG. 1 is a central longitudinal vertical section through a fluid motor actuator constructed according to the invention, the plane of the section being indicated by the line 1—1 on FIG. 2.

Referring now to the drawings by reference characters, the numeral 1 indicates a housing block which is provided with a pair of vertically spaced parallel cylindrical bores 2 and 3 which extend outwardly in opposite directions toward the ends of the housing block 1, and intersect a centrally disposed cylindrical chamber 4 within the block 1.

The outer end of the bore 2 terminates in a slightly larger cylindrical bore 5, which in turn terminates in a slightly further enlarged cylindrical bore 6 having an internally threaded section 7 intermediate the ends thereof. An annular shoulder 8 is interposed between the outer end of the bore 3 and the inner end of the bore 5; and an annular shoulder 9 connects the outer end of the bore 5 and the inner end of the bore 6.

The outer end of the bore 3 terminates in a slightly larger cylindrical bore 10, the inner end of which is connected to the outer end of the bore 3 by an annular shoulder 11; and the outer end of the bore 10 terminates in a further enlarged bore 12, the inner end of which is connected to the outer end of the bore 10 by an annular shoulder 13. The bore 12 is provided, intermediate the ends thereof with an internally threaded section as indicated at 14.

A sleeve, generally indicated by the numeral 15, is secured within the bores 5 and 6; and a similar sleeve 16 is similarly secured within the bores 10 and 12. Each of the sleeves 15 and 16 comprises a body 17 having an externally threaded section 18, a head 19 at one end thereof, and a reduced cylindrical extension 20 at the other end thereof, the outer end of which is connected to the inner end of the body 17 by an annular flange 21. The body 17 and extension 20 are provided with a cylindrical bore 22 which is open at the inner end thereof and is closed at the outer end thereof by the head 19.

The sleeve 15 is removably and adjustably secured within the bores 5 and 6 by the interengagement of the externally threaded section 18 thereof with the internally threaded section 7 of the bore 6. The reduced cylindrical extension 20 extends a substantial distance into the bore 5, the outside diameter of which is the same as the inside diameter of the bore 5. The cylindrical bore 22 in the sleeve 15, the diameter of which is the same as the diameter of the cylindrical bore 2, constitutes an extension of the bore 2.

The sleeve 16 is similarily, removably and adjustably, secured within the bores 10 and 12 by the interengagement of the externally threaded section 18 thereof with the internally threaded section 14 of the bore 12. The reduced cylindrical extension 20 extends a substantial distance into the bore 10, the outside diameter of which is the same as the inside diameter of the bore 10. The cylindrical bore 22 in the sleeve 16, the diameter of which is the same as the diameter of the bore 3, constitutes an extension of the bore 3.

The heads 19 of the sleeves 15 and 16 are provided with recesses 23 for the reception of a spanner wrench for use in inserting, removing, and adjusting the sleeves 15 and 16 within their respective reception bores; and set screws 24 are provided for locking the sleeves 15 and 16 in adjusted positions. Fluid sealing means 25, preferably in the form O-rings, are disposed in complementary annular recesses 26 in the sleeves 15 and 16 to prevent the escape of actuating fluid from the bores 2 and 3 in the, housing 1 and extension bores 22 in the sleeves 15 and 16.

The chamber 4 is closed at one side thereof by a bearing block 27, which is provided with O-ring sealing means 28, and at the other side thereof by a screw threaded removable cap 29 which is provided with O-ring seals 30. The bearing block 27 and the removable cap 29 are provided with spaced axially aligned bearings, 31 and 32 respectively, in which a shaft 33 is rotatably mounted. A spur gear 34, which is keyed to the shaft 33, is disposed within the chamber 4 and extends radially into both of the bores 2 and 3 which are intersected by the chamber 4.

A fluid actuated piston 35 is reciprocally mounted in each of the bores 22 in the sleeves 15 and 16. The piston 35 in the bore 22 of the sleeve 15 has a rack 36 secured thereto which extends inwardly therefrom into the bore 2 in mesh with the upper section of the gear 34; and a piston 35 which is similarly mounted in the bore 22 of the sleeve 16 has a similar rack 36 secured thereto which extends inwardly therefrom into the bore 3 and meshes with the lower section of the gear 34. The inward movement of the pistons 35, and racks 36 secured thereto, which are each provided with O-ring fluid seals 37, will rotate the gear 34 in a clockwise direction, and the return outward movement of the pistons 35 and racks 36 will rotate the gear 34 in a counterclockwise direction. The movement of the pistons 35 and racks 36 inwardly is limited by the engagement of the ends of the racks 36 with the closed ends 38 of the bores 2 and 3, and the outward movement of the pistons 35 and racks 36 is limited by the engagement of the pistons 35 with the heads 19 of the sleeves 15 and 16. The stroke of the pistons 35 and racks 36, and consequently the rotation of the gear 34 and shaft 33, may be minutely adjusted by screwing the sleeves 15 and 16 in or out within the bores 6 and 12 respectively.

The manner in which actuating fluid under pressure is alternately imparted to opposite sides of the pistons 35 will now be described. The space between the annular shoulder 9 connecting the outer end of the bore 5 with the inner end of the bore 6, and the annular shoulder 21 between the outer end of the reduced extension 20 and the inner end of the body 17 of the sleeve 15 provides an annular ring shaped chamber 39 between the outer periphery of the reduced extension 20 and the inner periphery of the bore 6. A similar annular ring shaped chamber 40 is provided between the outer periphery of the reduced extension 20 of the sleeve 16 and the inner periphery of the bore 12. The annular ring shaped chamber 39 is connected to the bore 22 in the sleeve 15 behind the piston 35 mounted therein by a plurality of ducts 41 in the body 17 of the sleeve 15; and the ring shaped chamber 40 is similarly connected to the bore 22 in the sleeve 16 behind the piston 35 therein by a plurality of similar ducts 41.

Fluid, preferably oil, under pressure is adapted to be supplied to the ring shaped chamber 39 through a conduit 42 in the housing 1, and to the ring shaped chamber 40 through the conduit 42 and a branch conduit 43. From the chambers 39 and 40 the fluid under pressure is supplied to the bores 22, in the sleeves 15 and 16, behind the pistons 35 therein through the ducts 41. Fluid under pressure is likewise adapted to be supplied to the other sides of the pistons 35 through a conduit 44 which discharges into the bore 3, and a branch conduit 45 which discharges into the bore 2. As fluid is being supplied to the outer ends of the pistons 35 through the conduits 42 and 43 fluid is discharged from the bores 2 and 3 through the conduits 44 and 45; and conversely when fluid is being supplied to the inner ends of the pistons 35 through the conduits 44 and 45 fluid is discharged from the bores 22 through the conduits 42 and 43. Any suitable means, not shown, such as a 3-way valve, may be provided for controlling the alternate supplying of fluid under pressure to opposite ends of the pistons 35.

FIGS. 3 and 4 disclose a slightly modified form of the invention, and one type of a limit stop by which major adjustments in the stroke of the pistons may be made. In this form of the invention the bores 3, 10 and 12, the sleeve 16 and the piston 35 and rack 36 associated therewith are eliminated. Otherwise the construction and operation of this form of the invention is identical with that shown in FIGS. 1 and 2 and the same reference numerals are applied to like parts.

The limit stop, by which major adjustments in the stroke of the piston 35 and rack 36 may be made, which is shown in FIG. 3 and generally indicated by the numeral 46 comprises a cylindrical head 47 and an elongated exteriorly thread stud 48 integral therewith. The stop 46 is adjustably mounted in a bore 49 in the housing 1 which is disposed in axial alignment with the bore 2. The inner end of the bore 49 is interiorly threaded as indicated at 50, and the outer end thereof is smooth as indicated at 51. The stud 48 of the stop 46 is screwed into the threaded section 50 of the bore 49 and the head 47 thereof is received in the smooth section 51 of the bore 49. The head 47 is provided with a screw-driver slot 52 for use in adjusting the stop 46 back and forth in the bore 49; and an O-ring seal 53 for preventing the escape of fluid from the bore 2. The inner end of the stop 46 is adapted to be engaged by the inner end of the rack 36 and thereby limit the movement of the rack 36 and piston 35 in their inward movement. By first adjusting the stop 46 and then the sleeve 15 a very minute and accurate adjustment of the rotary movement of the shaft 33 may be obtained.

Figures 2, 5:
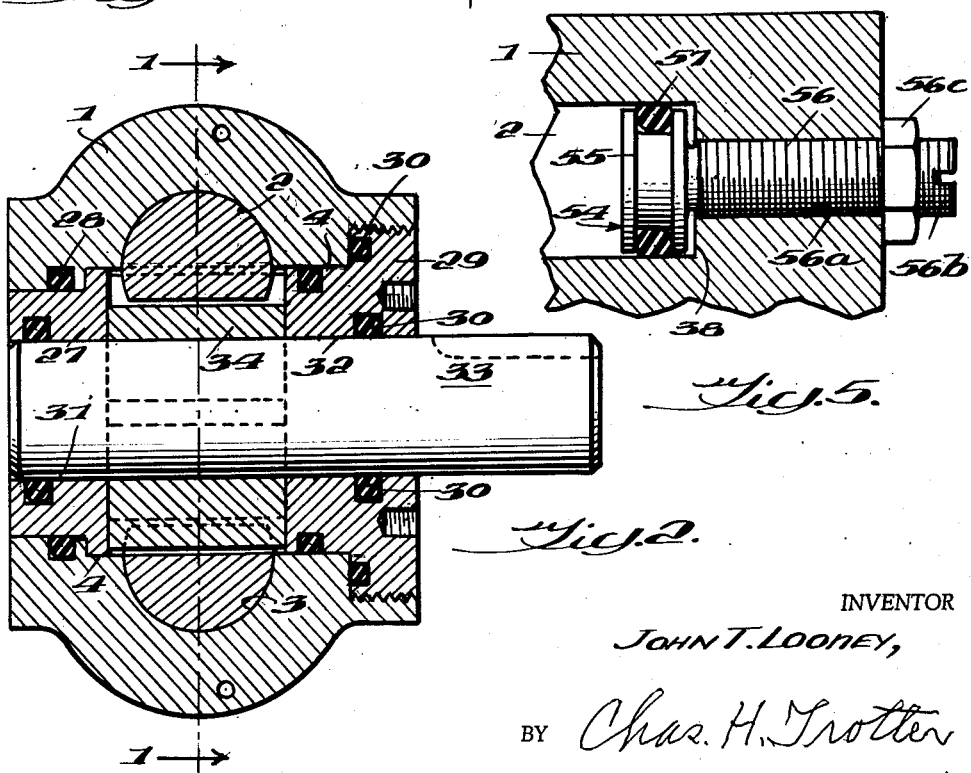
FIG. 2 is a medial transverse vertical section taken on the line 2—2 on FIG. 1.
FIG. 5 is a detailed sectional view showing another type of stroke adjusting mechanism.

A slightly modified form of the limiting stop is shown in FIG. 5. As shown therein the limit stop, generally indicated by the numeral 54, by which the inward movement of the rack 36 and piston 35 is adapted to be adjustably limited comprises a cylindrical head 55 and an elongated externally threaded stud 56. The head 55, which is provided with an O-ring seal 57, is disposed in the bore 2 and the threaded stud 56 is screwed into an internally threaded bore 58 in the end wall 38. The outer end of the stud 56 is provided with a screw-driver slot 58 for use in adjusting the head forwardly and rearwardly within the bore 2. A lock nut 59 is provided for locking the stop 54 in adjusted position. Otherwise the limit stop 54 is the same as the limit stop 46 and functions in the same manner. Obviously the limit stop 46 and 54 may be also used in a like manner with the form of the invention shown in FIGS. 1 and 2.

FIG. 6 discloses a combined limit stop and cushioning mechanism, generally indicated by the numeral 58, by which the inward movement of a rack 36 and piston 35 is adapted to be limited and gradually cushioned to a stop. The limiting and cushioning mechanism 58 comprises an exteriorly threaded body 59 having a head 60 integral therewith, which is adapted to be screwed into an internally threaded bore 61 disposed in the housing 1 in axial alignment with one of the bores 2 or 3. The body 59 is provided with a centrally disposed longitudinal cylindrical bore 62 which extends outwardly from a medial vertical wall 63 to the inner end of the body 59 and is closed at the outer end thereof by removable plug 64. A reduced cylindrical bore 65 which extends outwardly from the wall 63 to the outer end of the body 59 is disposed in axial alignment with the bore 62.

A plunger, 66, which is slidably mounted in the bore 62, is provided at one end thereof with an integral stud 67 of lesser diameter than the plunger 66 which extends out beyond the plug 64 through a complementary aperture 68 therein; and at the opposite end thereof by an elongated stud 69, of lesser diameter than the stud 67, which extends out through the bore 65. The plunger 66 is provided with an O-ring sealing ring 70 to prevent the escape of fluid from one side thereof to the opposite side thereof. A fluid seal 71 is disposed about the stud 67 to prevent the escape of fluid from the bore 2 in the housing 1 into the bore 62 in the body 59 of the mechanism 58; and a fluid seal 80 is disposed about the stud 69 to prevent the escape of fluid from the bore 62 about the periphery of the stud 69. The surface area of the end 78 of the plunger 66 about the stud 69 is slightly greater than the surface area of the end 79 of the stud 67.

A bore 72, which is disposed in the body 60, extends inwardly from the outer end of the body 59 parallel to the bore 65 and terminates in a reduced axially aligned elongated bore 73 which extends out to the inner end of the body 59. A pair of spaced parallel bores 74 and 75, one of which 75 is disposed at the junction of the bores 72 and 73 provide fluid passageways between the bore 62 and the reduced elongated bore 73. A needle valve 76, which is threaded into the bore 72, is provided for adjusting the rate of flow of fluid from the bore 62 through the bore 75 into the bore 73; and a nut 77 is provided for locking the needle valve 76 in adjusted position.

In operation, as the rack 36 is moved inwardly in the bore 2 by the piston 35 the free end thereof will engage the end 79 of the stud 67 and force the plunger 66 outwardly in the bore 62. As the plunger 66 is moved outwardly fluid in the bore 62 will be forced out from the bore 62 through the bores 74 and 73 into the elongated bore 2 until the plunger 66 closes the bore 74, after which fluid in the bore 62 will be forced out therefrom through the needle valve restricted bore 75 and the bore 73 into the elongated bore 2. The inward movement of the rack 36 will thereby be gradually cushioned to a stop until the end 78 of the plunger 66 engages the wall 63.

When actuating fluid is imparted to the elongated bore 2 under pressure to return the rack 36 and piston 35 back to initial position, the fluid will also be imparted to the bore 62 through the bores 73, 74 and 75 and return the plunger 66 and studs 67 and 69 to initial position since the area of the end 78 of the plunger 66 is greater than the area of the end 79 of the stud 67.

From the foregoing it will be apparent to those skilled in this art that I have provided very simple and efficient means for accomplishing the objects of the invention; and it is to be understood that I am not limited to the specific construction shown and described herein as various modifications may be made therein within the spirit of the invention and the scope of the appended claims.

What is claimed is:

1. A fluid motor actuator of the character described comprising a housing block, an elongated cylindrical bore in said block, said bore being closed at the inner end thereof and extending outwardly therefrom and terminating in enlarged axially aligned bore the outer end of which terminates in an end wall of said block, a sleeve threaded into said enlarged bore for back and forth adjustment therein, a sleeve bore which is closed at the outer end thereof disposed in said sleeve in axial alignment with said elongated bore, said block having a chamber therein which intersects said elongated bore, a transversely extending shaft rotatably mounted in said block in axial alignment with said chamber, a spur gear secured to said shaft within said chamber, a piston reciprocally mounted in said sleeve bore, a rack secured to said piston and extending away therefrom into said elongated bore and meshing with said gear, and means by which actuating fluid is alternately imparted to and discharged from opposite sides of said piston.

2. A fluid motor actuator as defined by claim 1 in which an adjustable limit stop extends into said elongated bore through the inner end thereof, said limit stop being adapted to be engaged by the free end of said rack and thereby limit the inward movement of said piston and rack.

3. A fluid motor actuator as defined by claim 1 in which a cushioning mechanism, which is mounted in said block, extends into said elongated bore through the inner end thereof in position to be engaged by the free end of said rack, is provided to gradually cushion the inward movement of said piston and rack to a stop.

4. A fluid motor actuator of the character described comprising a housing block, a first elongated cylindrical bore in said block, said first bore being closed at the inner end thereof and extending outwardly therefrom toward one end of said housing block, and terminating in a first enlarged axially aligned bore the outer end of which terminates in the said one end of said housing block, a second elongated cylindrical bore disposed in said block in spaced parallel relation to said first elongated bore, said second elongated bore being closed at the inner end thereof and extending outwardly therefrom toward the other end of said block and terminating in an axially aligned second enlarged bore which terminates in the said other end of said block, a medially disposed chamber in said block which is intersected by said first and second elongated bores, a transversely extending shaft rotatably mounted in said block in axial alignment with said chamber, a spur gear secured to said shaft within said chamber, a first sleeve threaded into said first enlarged bore for back and forth adjustment therein, a first sleeve bore which is closed at the outer end thereof disposed in said first sleeve in axial alignment with said first elongated bore, a second sleeve threaded into said second enlarged bore for back and forth adjustment therein, a second sleeve bore which is closed at the outer end thereof disposed in said second sleeve in axial alignment with said second elongated bore, a first piston reciprocally mounted in said first sleeve bore, a first rack secured to said first piston and extending away therefrom into said first elongated bore and meshing with said gear, a second piston reciprocally mounted in said second sleeve bore, a second rack secured to said second piston and extending away therefrom into said second elongated bore and meshing with said gear diametrically opposite the meshing of said first rack with said gear, and means by which actuating fluid is alternately simultaneously imparted to and discharged from opposite sides of said first and second pistons.

5. A fluid motor actuator as defined by claim 4 in which an adjustable limit stop extends into one of said first and second elongated bores through the inner end thereof, said limit stop being adapted to be engaged by the free end of one of said first and second racks, and thereby limit the inward movement of said first and second pistons and racks.

6. A fluid motor actuator as defined by claim 4 in which a cushioning stop mechanism, which is mounted in said housing block extends into one of said elongated bores through the inner end thereof in position to be engaged by the free end of one of said first and second racks, is provided to gradually cushion said first and second pistons and racks to a stop.

7. A fluid motor actuator of the character described comprising a housing block, an elongated cylindrical bore in said block said bore being closed at the inner end thereof and extending outwardly therefrom and terminating in an enlarged axially aligned bore the outer end of which terminates in a further enlarged axially aligned bore the outer end of which terminates in an end wall of said housing, a sleeve threaded into said further enlarged bore for back and forth adjustment therein, said sleeve having an integral cylindrical extension which extends into said enlarged bore, a sleeve bore disposed in said sleeve and said cylindrical extension in axial alignment with said elongated bore, a chamber disposed in said housing which is intersected by said elongated bore, a transversely extending shaft rotatably mounted in said housing block in axial alignment with said chamber, a spur gear secured to said shaft within said chamber, a piston reciprocally mounted in said sleeve bore, a rack secured to said piston and extending away therefrom into said elongated bore and meshing with said gear, and actuating fluid supply means by which actuating fluid is alternately imparted to and discharged from opposite sides of said piston.

8. A fluid motor actuator as defined by claim 7 in which said actuating fluid supply means comprises an annular ring shaped chamber disposed between the outer periphery of said cylindrical extension and the inner periphery of said enlarged bore, a duct disposed in said sleeve which provides a fluid passageway between said annular ring shaped chamber and said sleeve bore behind the said piston reciprocally mounted therein, and conduit means in said housing block through which actuating fluid is supplied to and discharged from said ring shaped chamber.

9. A fluid motor actuator as defined by claim 7 in which an adjustable limit stop extends into said elongated bore through the inner end thereof, said limit stop being adapted to be engaged by the free end of said rack and thereby limit the inward movement of said piston and rack.

10. A fluid motor actuator as defined by claim 7 in which a cushioning mechanism, which is mounted in said block, extends into said elongated bore through the inner end thereof in position to be engaged by the free end of said rack, is provided to gradually cushion the inward movement of said piston and rack to a stop.

11. A fluid motor actuator of the character described comprising a housing block, a first elongated bore in said housing block, said first elongated bore being closed at one end thereof and extending outwardly therefrom toward one end of said block and terminating in a first enlarged bore which is disposed in axial alignment therewith and terminates in a further enlarged axially aligned bore the outer end of which terminates in the said end of said housing, a second elongated bore disposed in said housing in spaced parallel relation to said first elongated bore, said second elongated bore being closed at the inner end thereof and extending outwardly therefrom toward the other end of said housing and terminating in an axially aligned second enlarged bore the outer end of which terminates in a second further enlarged bore the outer end of which terminates in the said other end of said block, a medial disposed chamber which is intersected by said first and second elongated bores, a transversely disposed shaft rotatably mounted in said housing block in axial alignment with said chamber, a spur gear secured to said shaft within said chamber; a first sleeve threaded into said first further enlarged bore for back and forth adjustment therein, said first sleeve having an integral cylindrical extension which extends into said first enlarged bore, a first sleeve bore disposed in said first sleeve and said first cylindrical extension in axial alignment with said first enlarged bore; a second sleeve threaded into said second further enlarged bore for back and forth adjustment therein, said second sleeve having a second cylindrical extension which extends into said second enlarged bore, a second sleeve bore disposed in said second sleeve and said second cylindrical extension in axial alignment with said second elongated bore; a first piston reciprocally mounted in said first sleeve bore, a first rack secured to said first piston and extending into said first elongated bore in mesh with said gear; a second piston reciprocally mounted in said second sleeve bore, a second rack secured to said second piston and extending into said second elongated bore in mesh with said gear diametrically opposite the meshing of said first rack with said gear; and fluid supply means by which actuating fluid is alternately simultaneously imparted to and discharged from opposite sides of said first and second pistons; said fluid supply means comprising a first annular ring shaped chamber disposed between the outer periphery of said first cylindrical extension and the inner periphery of said first enlarged bore, a second annular ring shaped chamber disposed between the outer periphery of said second cylindrical extension and the inner periphery of said second enlarged bore; a duct disposed in said first sleeve which provides a fluid passageway between said first ring shaped chamber and said first sleeve bore behind said first piston, a second duct disposed in said second sleeve which provides a fluid passageway between said second ring shaped chamber and said second sleeve bore behind said second piston, and conduit means in said housing block through which actuating fluid is simultaneously supplied to and discharged from said first and second ring shaped chambers.

12. A fluid motor actuator as defined by claim 11 in which an adjustable limit stop extends into one of said first and second elongated bores through the inner end thereof, said limit stop being adapted to be engaged by the free end of one of said first and second racks, and thereby limit the inward movement of said first and second pistons and racks.

13. A fluid motor actuator as defined by claim 11 in which a cushioning stop mechanism, which is mounted in said housing block extends into one of said elongated bores through the inner end thereof in position to be engaged by the free end of one of said first and second racks, is provided to gradually cushion said first and second pistons and racks to a stop.

References Cited in the file of this patent
FOREIGN PATENTS
933,424     Great Britain _____ Aug. 8, 1963